(12) United States Patent
Takubo et al.

(10) Patent No.: US 11,874,195 B2
(45) Date of Patent: Jan. 16, 2024

(54) PRELOAD INSPECTION METHOD FOR BEARING DEVICE FOR VEHICLE WHEEL

(71) Applicant: NTN Corporation, Osaka (JP)

(72) Inventors: Takayasu Takubo, Iwata (JP); Takuya Obata, Iwata (JP); Takayuki Owada, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/762,778

(22) PCT Filed: Aug. 28, 2020

(86) PCT No.: PCT/JP2020/032681
§ 371 (c)(1),
(2) Date: Mar. 23, 2022

(87) PCT Pub. No.: WO2021/059865
PCT Pub. Date: Apr. 1, 2021

(65) Prior Publication Data
US 2022/0349778 A1 Nov. 3, 2022

(30) Foreign Application Priority Data
Sep. 26, 2019 (JP) .................................. 2019-175939

(51) Int. Cl.
*G01M 13/04* (2019.01)
*B60B 27/00* (2006.01)
*F16C 19/18* (2006.01)

(52) U.S. Cl.
CPC ......... *G01M 13/04* (2013.01); *B60B 27/0094* (2013.01); *F16C 19/18* (2013.01); *B60B 2380/75* (2013.01); *F16C 2326/02* (2013.01)

(58) Field of Classification Search
CPC ...... G01M 13/04; F16C 19/18; F16C 2326/02
See application file for complete search history.

(56) References Cited

U.S. PATENT DOCUMENTS 4,165,636 A 8/1979 Bartholet
6,003,229 A 12/1999 Beduhn et al.
(Continued)

FOREIGN PATENT DOCUMENTS

CN          1948775        4/2007
DE    20 2014 104 737     12/2014
(Continued)

OTHER PUBLICATIONS

International Search Report dated Nov. 10, 2020 in International Application No. PCT/JP2020/032681.
(Continued)

*Primary Examiner* — Eric S. McCall
(74) *Attorney, Agent, or Firm* — Wenderoth, Lind & Ponack, L.L.P.

(57) ABSTRACT

A preload inspection method with which a preload value can be calculated more accurately. The preload inspection method for a wheel bearing device provided with an outer member having an outside raceway surface, an inner member having an inside raceway surface, and rolling bodies, is provided with: a power calculation step in which the outer member or the inner member is rotated in a relative manner and the power is calculated; a preload value calculation step in which a preload value is calculated on the basis of the power calculated in the power calculation step; and a pass/fail determination step is made on the basis of whether the preload value calculated in the preload value calculation step is within a permissible range.

5 Claims, 10 Drawing Sheets

(56) References Cited

U.S. PATENT DOCUMENTS

| | | | |
|---|---|---|---|
| 6,070,325 A | 6/2000 | Miyata et al. | |
| 6,343,420 B1 | 2/2002 | Beduhn et al. | |
| 6,473,962 B1 | 11/2002 | Beduhn | |
| 6,557,245 B2 | 5/2003 | Beduhn et al. | |
| 6,588,107 B2 | 7/2003 | Beduhn | |
| 6,796,031 B1 | 9/2004 | Russell | |
| 7,753,801 B2 | 7/2010 | Umekida et al. | |
| 8,057,314 B2 | 11/2011 | Umekida et al. | |
| 2002/0040526 A1 | 4/2002 | Beduhn et al. | |
| 2002/0133951 A1 | 9/2002 | Beduhn | |
| 2004/0177509 A1 | 9/2004 | Russell | |
| 2009/0069100 A1 | 3/2009 | Umekida et al. | |
| 2009/0252447 A1* | 10/2009 | Hirai | F16C 43/04 384/513 |
| 2011/0053696 A1 | 3/2011 | Umekida et al. | |
| 2019/0058428 A1* | 2/2019 | Barlini | H02P 21/16 |
| 2021/0070163 A1* | 3/2021 | Yada | H02K 7/14 |
| 2022/0349778 A1* | 11/2022 | Takubo | F16C 19/186 |
| 2022/0373036 A1* | 11/2022 | Hashizume | F16C 19/548 |

FOREIGN PATENT DOCUMENTS

| | | |
|---|---|---|
| EP | 2 722 548 | 4/2014 |
| EP | 3 561 328 | 10/2019 |
| JP | 10-185717 | 7/1998 |
| JP | 11-44319 | 2/1999 |
| JP | 2000-009562 | 1/2000 |
| JP | 2006-77830 | 3/2006 |
| JP | 2006-300086 | 11/2006 |
| JP | 2007-211946 | 8/2007 |
| JP | 2011-112184 | 6/2011 |
| JP | 2017-106520 | 6/2017 |
| JP | 2018-165566 | 10/2018 |
| JP | 6551634 | 7/2019 |

OTHER PUBLICATIONS

Notice of Reasons for Refusal dated Nov. 30, 2021 in corresponding Japanese Patent Application No. 2019-175939 with English translation.

Extended European Search Report dated Oct. 18, 2022 in corresponding EP Application No. 20868487.8.

* cited by examiner

PRELOAD INSPECTION METHOD FOR BEARING DEVICE FOR VEHICLE WHEEL

TECHNICAL FIELD

The present invention relates to a preload inspection method for a bearing device for a vehicle wheel.

BACKGROUND ART

Conventionally, a bearing device for a vehicle wheel that rotatably supports a wheel has been known (see Patent Literature 1). In a bearing device for a vehicle wheel, an inner member is disposed on an inner side of an outer member, and a rolling body is interposed between a raceway surface of the outer member and a raceway surface of the inner member. In this way, the bearing device for a vehicle wheel constitutes a rolling bearing structure that allows a wheel attached to the inner member to be rotatable.

In such a rolling bearing structure, an internal gap falls within an allowable range to enable smooth rotation of a wheel while suppressing rattling. The internal gap can be defined as a relative axially movable amount between the outer member and the inner member. In this respect, in the bearing device for a vehicle wheel, the internal gap has a negative value, and a preload is being applied to a rolling body. Therefore, resistance is generated against rotation of the wheel.

Patent Literature 1 describes a preload inspection method for a bearing device for a vehicle wheel. According to such a preload inspection method, a value of a preload applied to a rolling body can be calculated. However, in recent years, there has been an increasing demand for a vehicle to have low fuel consumption, and there has been a demand for a preload inspection method enabling calculation of a preload value with higher accuracy. Consequently, there has been a demand for a preload inspection method enabling determination whether a preload state is acceptable or not with higher accuracy.

CITATIONS LIST

Patent Literature

Patent Literature 1: JP-A 10-185717 Gazette

SUMMARY OF INVENTION

Technical Problems

Provided is a preload inspection method enabling calculation of a preload value with higher accuracy. Consequently, there is provided a preload inspection method enabling determination whether a preload state is acceptable or not with higher accuracy.

Solutions to Problems

A first aspect of the present invention is a preload inspection method for a bearing device for a vehicle wheel, in which the bearing device for a vehicle wheel includes: an outer member having multiple-row outer raceway surfaces; an inner member that is configured with a hub ring and an inner ring press-fitted into a small-diameter step portion of the hub ring and has multiple-row inner raceway surfaces; and multiple-row rolling bodies each interposed between the raceway surfaces of the outer member and the inner member, the preload inspection method for a bearing device for a vehicle wheel including: a power calculating step of relatively rotating the outer member or the inner member to calculate a power; a preload value calculating step of calculating a preload value on the basis of the power calculated in the power calculating step; and an acceptance determining step of determining acceptance on the basis of whether or not the preload value calculated in the preload value calculating step falls within an allowable range.

According to a second aspect of the present invention, in the preload inspection method for the bearing device for a vehicle wheel according to the first aspect of the present invention, the power calculating step includes calculating powers at a plurality of rotation speeds, and the preload value calculating step includes calculating a preload value on the basis of a difference between two of the powers.

According to a third aspect of the present invention, in the preload inspection method for the bearing device for a vehicle wheel according to the second aspect of the present invention, the preload value calculating step includes applying a difference in power to a predetermined "relationship between a difference in power and a preload value" to calculate a corresponding preload value.

According to a fourth aspect of the present invention, in the preload inspection method for the bearing device for a vehicle wheel according to the second aspect of the present invention, the preload value calculating step includes applying a reciprocal of a difference in power to a predetermined "relationship between a reciprocal of a difference in power and a preload value" to calculate a corresponding preload value.

According to a fifth aspect of the present, the preload inspection method for the bearing device for a vehicle wheel according to any one of the first to fourth aspects of the present invention further includes a separate preload value calculating step of calculating a preload value on the basis of an internal gap of the bearing device for a vehicle wheel, in which the acceptance determining step includes determining acceptance on the basis of whether or not the preload value calculated in the preload value calculating step falls within an allowable range including the preload value calculated in the separate preload value calculating step.

Advantageous Effects of Invention

As effects of the present invention, the following effects are obtained.

The preload inspection method for a bearing device for a vehicle wheel according to the first aspect of the present invention includes the power calculating step of relatively rotating the outer member or the inner member to calculate a power; the preload value calculating step of calculating a preload value on the basis of the power calculated in the power calculating step; and the acceptance determining step of determining acceptance on the basis of whether or not the preload value calculated in the preload value calculating step falls within an allowable range. According to the preload inspection method for the bearing device for a vehicle wheel, since a preload value can be calculated without bridging the steps in an assembly process, the preload value is less likely to be affected by a progress of the assembly process, a change in environment, and the like, resulting in enabling a preload value to be calculated with higher accuracy. Consequently, acceptance determination of a preload state can be performed with higher accuracy.

In the preload inspection method for the bearing device for a vehicle wheel according to the second aspect of the present invention, the power calculating step includes calculating powers at a plurality of rotation speeds. The preload value calculating step includes calculating a preload value on the basis of a difference between two of the powers. According to the preload inspection method for the bearing device for a vehicle wheel, influence of individual differences due to an amount of grease and the like becomes less, so that the preload value can be calculated with higher accuracy. Consequently, acceptance determination of a preload state can be performed with higher accuracy.

In the preload inspection method for the bearing device for a vehicle wheel according to the third aspect of the present invention, the preload value calculating step includes applying a difference in power to a predetermined "relationship between a difference in power and a preload value" to calculate a corresponding preload value. According to the preload inspection method for the bearing device for a vehicle wheel, since the "relationship between a difference in power and a preload value" determined on the basis of actual results and experience is used, the preload value can be calculated with higher accuracy. Consequently, acceptance determination of a preload state can be performed with higher accuracy.

In the preload inspection method for the bearing device for a vehicle wheel according to the fourth aspect of the present invention, the preload value calculating step includes applying a reciprocal of a difference in power to a predetermined "relationship between a reciprocal of a difference in power and a preload value" to calculate a corresponding preload value. According to the preload inspection method for the bearing device for a vehicle wheel, since the "relationship between a reciprocal of a difference in power and a preload value" determined on the basis of actual results and experience is used, it is possible to calculate the preload value with higher accuracy. Even in a case where the rotation speed difference at the time of calculating the power is small, the preload value can be calculated with higher accuracy. Consequently, acceptance determination of a preload state can be performed with higher accuracy.

In the preload inspection method for the bearing device for a vehicle wheel according to the fifth aspect of the present invention, the acceptance determining step includes determining acceptance on the basis of whether or not the preload value calculated in the preload value calculating step falls within an allowable range including the preload value calculated in the separate preload value calculating step. According to the preload inspection method for the bearing device for a vehicle wheel, acceptance determination is performed on the basis of whether the preload value calculated by a new method using a power falls within the allowable range including the preload value calculated by a conventional reliable method using an internal gap. Therefore, determination whether a preload state is acceptable or not can be made with higher accuracy.

DESCRIPTION OF EMBODIMENT

Figure 1:
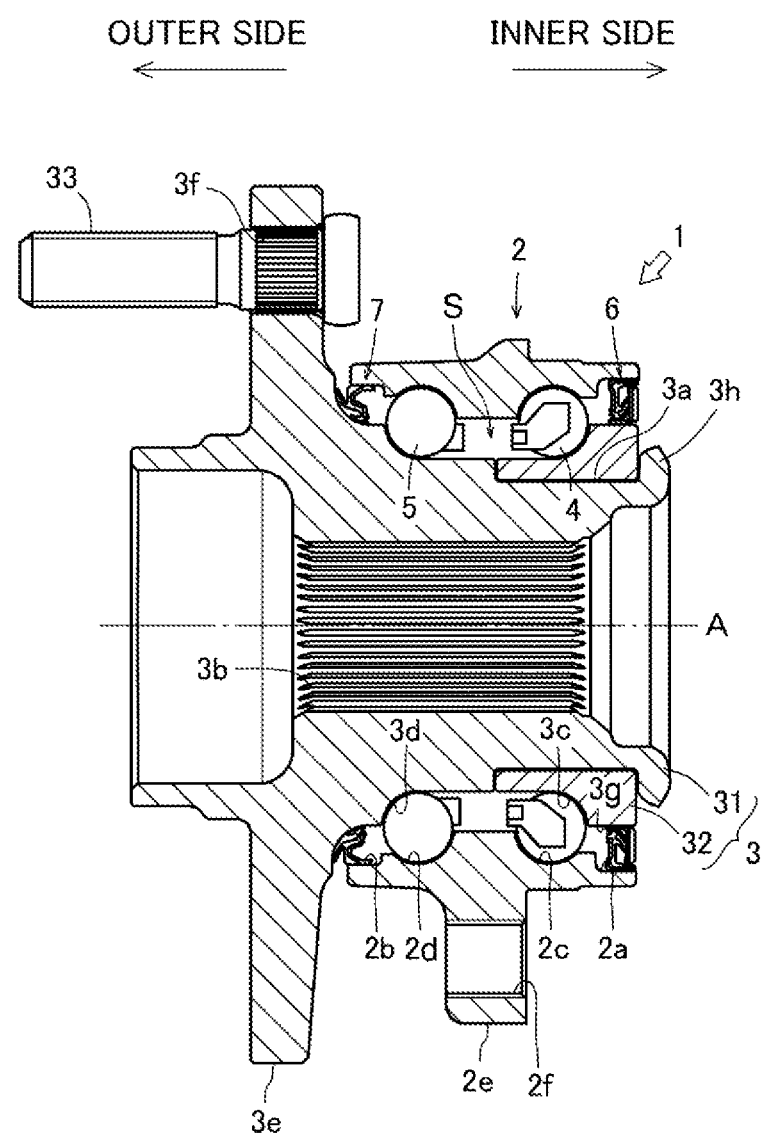
FIG. 1 is a view showing a structure of a bearing device for a vehicle wheel.
Figure 2:
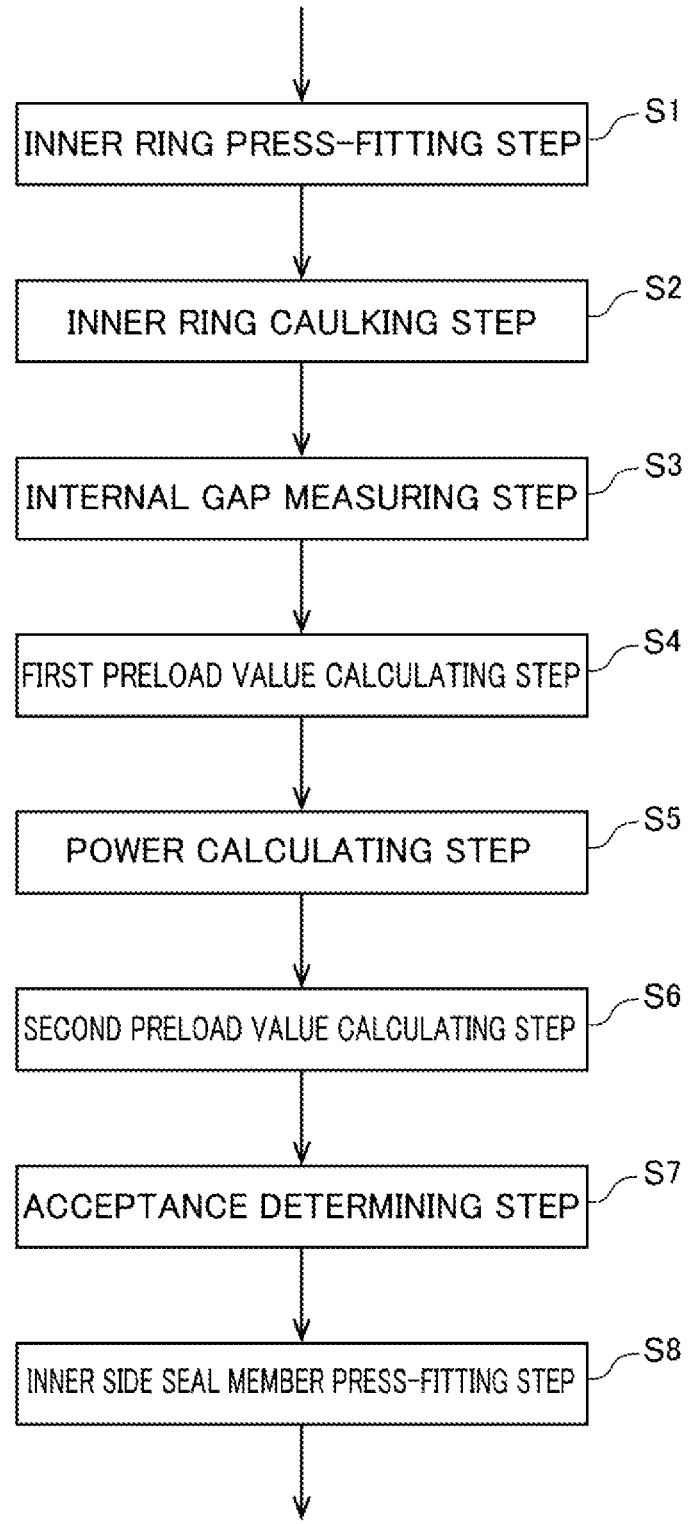
FIG. 2 is a diagram showing an assembly process of the bearing device for a vehicle wheel.

First, a structure of a bearing device for a vehicle wheel 1 will be described with reference to FIG. 1.

The bearing device for a vehicle wheel 1 rotatably supports a wheel. The bearing device for a vehicle wheel 1 includes an outer member 2, an inner member 3, and rolling bodies 4 and 5. In the present application, "inner side" represents a vehicle body side of the bearing device for a vehicle wheel 1, and "outer side" represents a wheel side of the bearing device for a vehicle wheel 1. "Radially outward" represents a direction separating from a rotation axis A of the inner member 3, and "radially inward" represents a direction approaching the rotation axis A of the inner member 3. Further, the "axis direction" represents a direction along the rotation axis A.

The outer member 2 constitutes an outer ring portion of the rolling bearing structure. A fitting surface $2a$ is formed on an inner periphery of an inner side end portion of the outer member 2. A fitting surface $2b$ is formed on an inner periphery of an outer side end portion of the outer member 2. Further, two outer raceway surfaces $2c$ and $2d$ are formed on an inner periphery of an axially central portion of the outer member 2. In addition, the outer member 2 has formed a vehicle body mounting flange $2e$ extending radially outward from an outer peripheral surface thereof. The vehicle body mounting flange $2e$ is provided with a plurality of bolt holes $2f$.

The inner member 3 constitutes an inner ring portion of the rolling bearing structure. The inner member 3 is configured with a hub ring 31 and an inner ring 32.

The hub ring 31 is disposed on an inner side of the outer member 2. A small-diameter step portion $3a$ is formed on an outer periphery of an inner side end portion of the hub ring 31 up to an axially central portion. The small-diameter step portion $3a$ represents a portion where an outer diameter of the hub ring 31 is reduced, and has an outer peripheral surface having a cylindrical shape centered on the rotation axis A. The hub ring 31 has a spline aperture $3b$ formed to penetrate from the inner side end portion to an outer side end portion thereof. Further, an inner raceway surface $3d$ is formed on the outer periphery of the axially central portion of the hub ring 31. In addition, the hub ring 31 has formed, from an outer peripheral surface thereof, a wheel mounting flange $3e$ extending radially outward. The wheel mounting flange $3e$ is provided with a plurality of bolt holes $3f$ centered on the rotation axis A, and a hub bolt 33 is press-fitted into each of the bolt holes $3f$.

The inner ring 32 is press-fitted into the small-diameter step portion $3a$ of the hub ring 31. A fitting surface $3g$ is formed on an outer periphery of an inner side end portion of the inner ring 32. An inner raceway surface 3c is formed on the outer periphery adjacent to the fitting surface 3g. Thus, the inner raceway surface 3c is formed on the outer periphery of the hub ring 31. The inner ring 32 is fixed by a caulking portion 3h obtained by expanding a front end portion of the small-diameter step portion 3a. In addition, some configuration may not include the caulking portion 3h.

The rolling bodies 4 and 5 constitute rolling portions of the rolling bearing structure. The rolling bodies 4 and 5 are so-called steel balls, and are arranged at equal intervals on the circumference by a cage. The rolling body 4 on the inner side is interposed between the outer raceway surface 2c of the outer member 2 and the inner raceway surface 3c of the inner ring 32. The rolling body 5 on the outer side is interposed between the outer raceway surface 2d of the outer member 2 and the inner raceway surface 3d of the hub ring 31. Although in the present bearing device for a vehicle wheel 1, the rolling bodies 4 and 5 each have a spherical shape, the shape may be a conical shape.

The bearing device for a vehicle wheel 1 includes an inner side seal member 6 and an outer side seal member 7. The inner side seal member 6 seals an inner side opening end of an annular space S formed between the outer member 2 and the inner member 3 (the hub ring 31 and the inner ring 32). The outer side seal member 7 seals an outer side opening end of the annular space S formed between the outer member 2 and the inner member 3 (the hub ring 31 and the inner ring 32). Note that these seal members 6 and 7 have various specifications, and these specifications are not limited. Instead of the inner side seal member 6, a cap can be press-fitted.

Next, an assembly process of the bearing device for a vehicle wheel 1 will be described with reference to FIG. 2 to FIG. 10.

Hereinafter, it is assumed that the bearing device for a vehicle wheel 1 is placed on a base 8. The base 8 has a recess portion 8a formed to accommodate a pilot portion of the hub ring 31, and a plurality of knock pins 8b is driven around the recess portion. Therefore, the bearing device for a vehicle wheel 1 is supported and fixed upward in a state where the knock pin 8b is inserted into each bolt hole 3f of the wheel mounting flange 3e.

Figure 3:
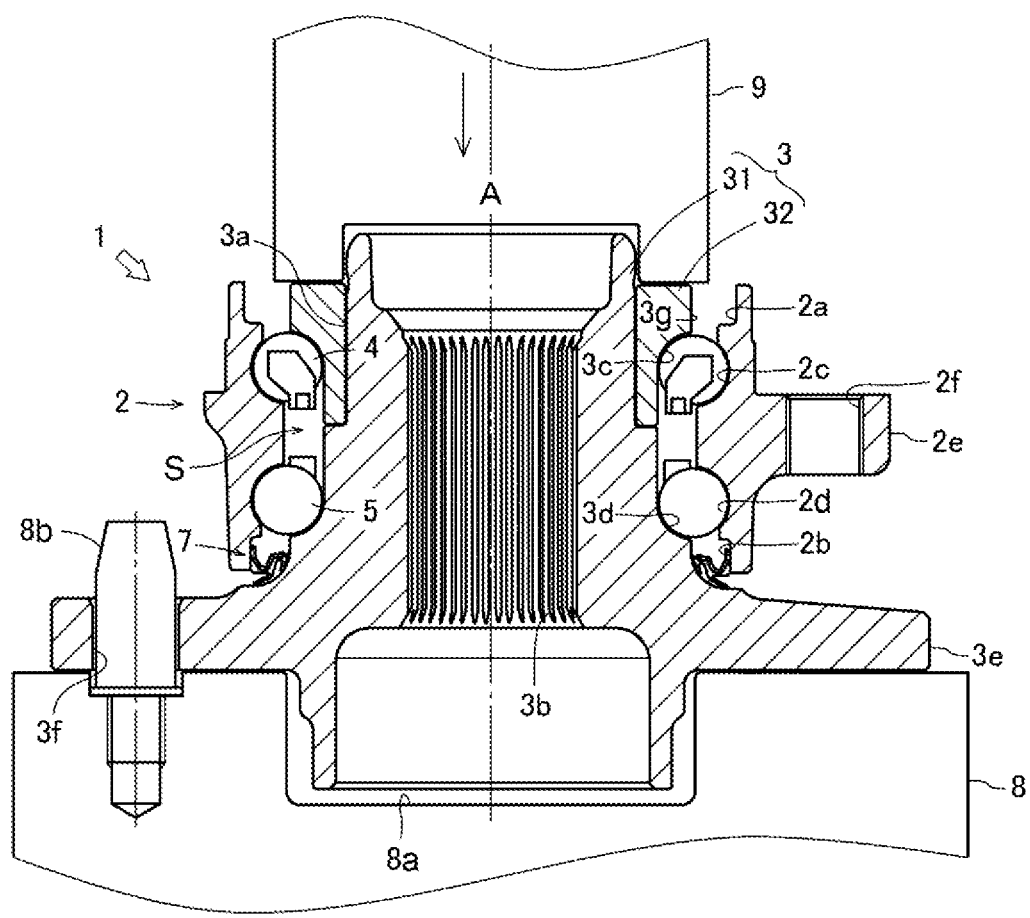
FIG. 3 is a view showing a state in which an inner ring is press-fitted into a small-diameter step portion of a hub ring.

An inner ring press-fitting step S1 is a step of press-fitting the inner ring 32 into the small-diameter step portion 3a of the hub ring 31 (see FIG. 3). In the inner ring press-fitting step S1, the inner ring 32 is press-fitted to a predetermined position of the small-diameter step portion 3a by applying a load using a press-fitting device 9 (temporary press-fitting). Then, a relative axially movable amount of the outer member 2 and the inner member 3 is measured. Lastly, the inner ring 32 is press-fitted to a predetermined position of the small-diameter step portion 3a on the basis of the axially movable amount (main press-fitting). This makes an internal gap have an appropriate value, and brings about a state where an appropriate preload is being applied to the rolling bodies 4 and 5.

Figure 4:
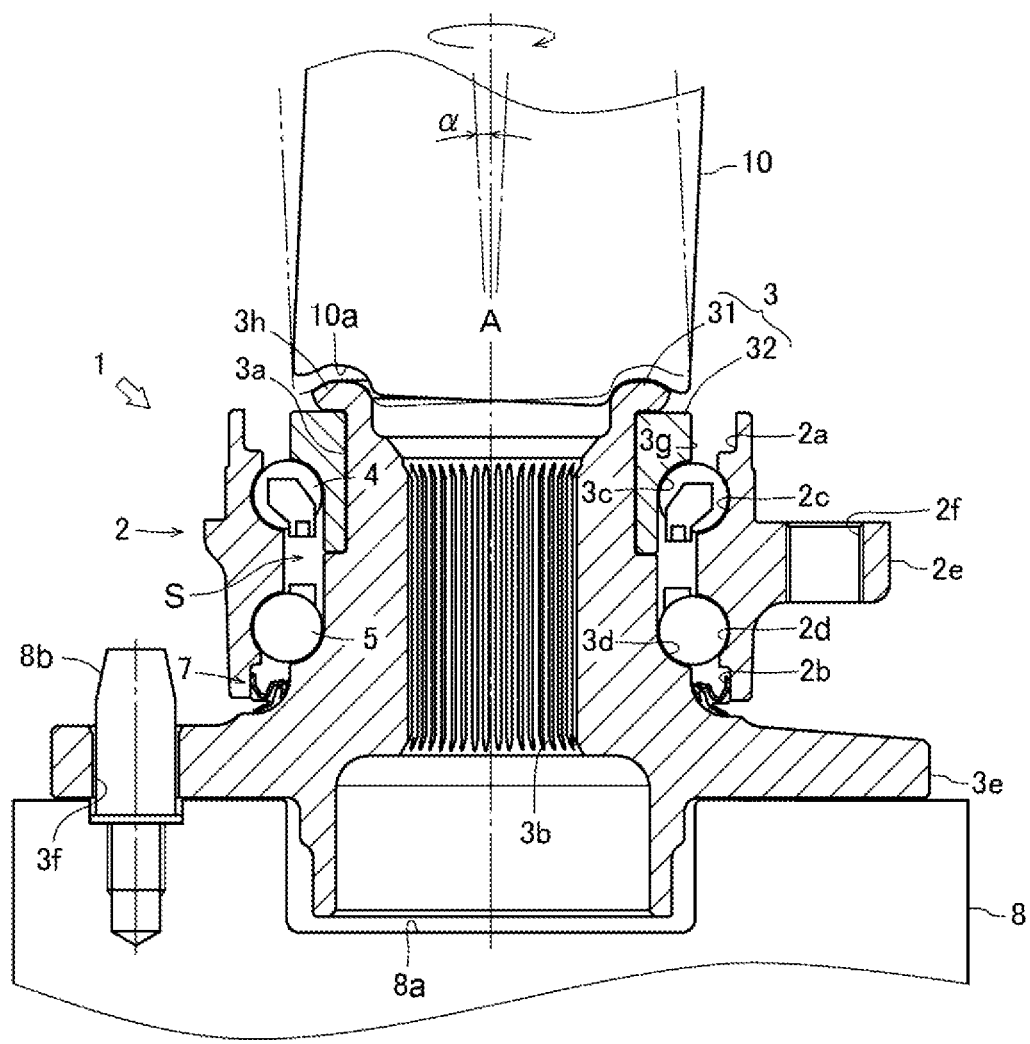
FIG. 4 is a view showing a situation in which a front end portion of the small-diameter step portion is expanded to caulk the inner ring.

An inner ring caulking step S2 is a step of expanding the front end portion of the small-diameter step portion 3a to caulk the inner ring 32 (see FIG. 4). In the Inner ring caulking step S2, a load is applied using a caulking device 10 to push and expand the front end portion of the small-diameter step portion 3a. Since the caulking device 10 rotates while maintaining a tilt angle α, the caulking device is allowed to continuously press the front end portion of the small-diameter step portion 3a while moving in a circumferential direction. In addition, since the caulking device 10 has a curved pressing surface 10a, it is possible to form the caulking portion 3h having a shape in which the pressing surface 10a is transferred.

Figure 5:
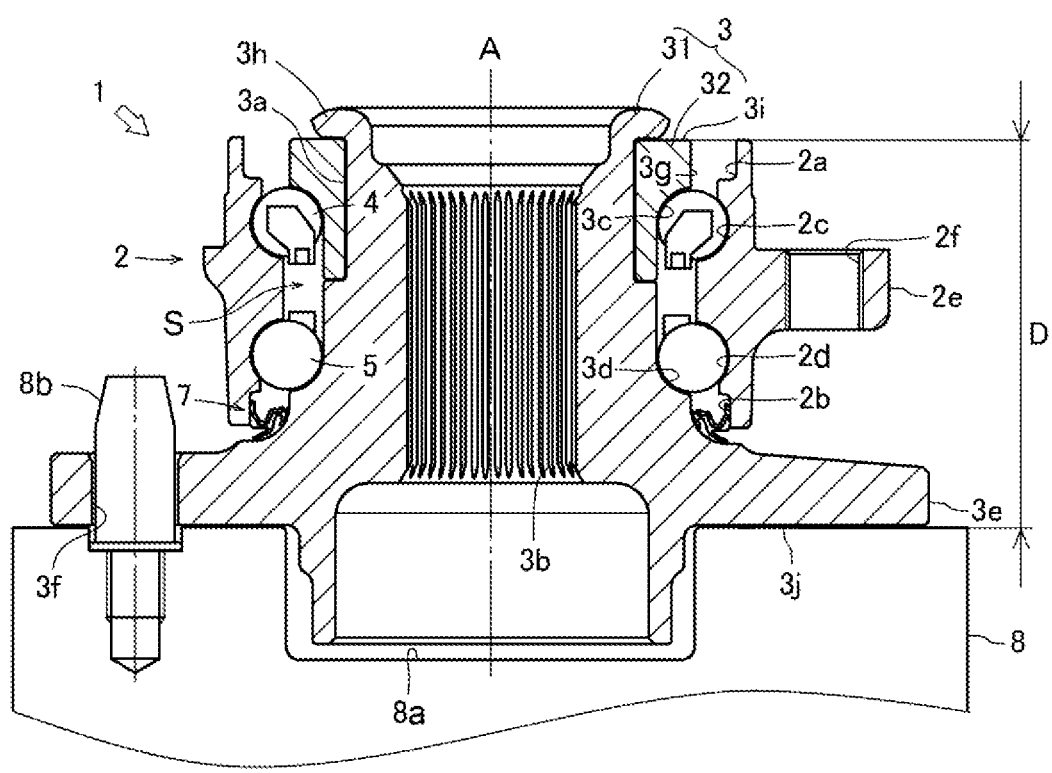
FIG. 5 is a view showing a state in which an opposing distance between the inner ring and a wheel mounting flange is measured.
Figure 6:
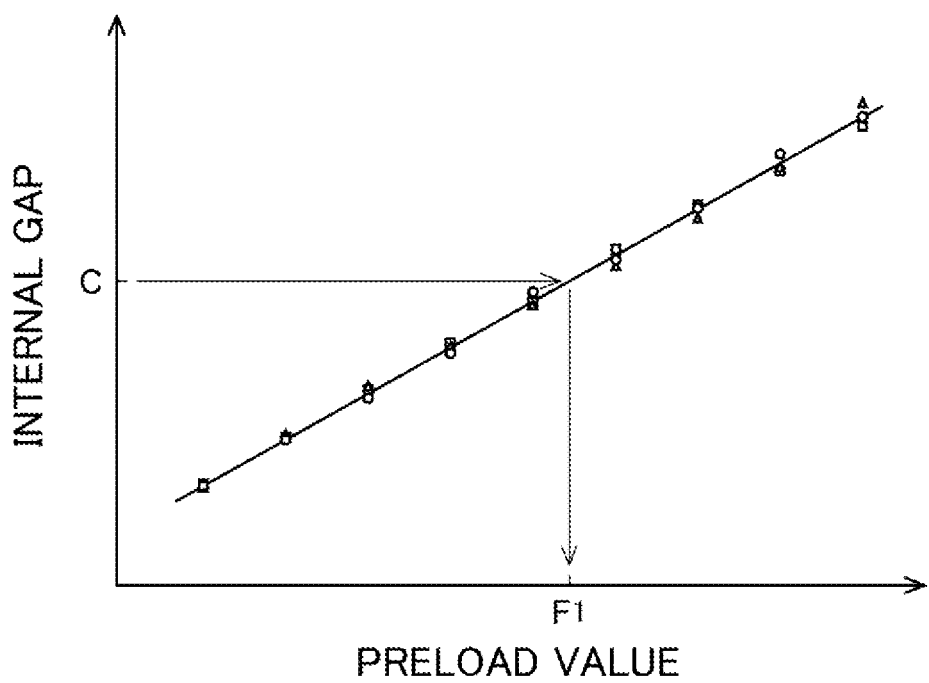
FIG. 6 is a diagram showing a relationship between an internal gap and a preload value.

An internal gap measuring step S3 is a step of measuring an internal gap on the basis of an appearance shape of the bearing device for a vehicle wheel 1 (see FIG. 5). In the internal gap measuring step S3, by sandwiching a portion between an inner side end surface 3i of the inner ring 32 and an outer side end surface 3j of the wheel mounting flange 3e using a measuring device (not illustrated), an opposing distance D between the end surfaces 3i and 3j is measured. Since the opposing distance D is naturally correlated with the internal gap, measuring the opposing distance D is equivalent to measuring the internal gap. As a result, an internal gap C can be measured (see FIG. 6).

A first preload value calculating step S4 is a step of calculating a preload value F1 on the basis of an internal gap. In the preload value calculating step S4, a "relationship between an internal gap and a preload value" determined on the basis of actual results and experience is used (see FIG. 6). The "relationship between an internal gap and a preload value" is represented by a graph in which the vertical axis corresponds to an internal gap and the horizontal axis corresponds to a preload value. Then, the corresponding preload value F1 is calculated by applying the internal gap C obtained in the internal gap measuring step S3 to the graph. The "relationship between an internal gap and a preload value" varies depending on the specifications of the bearing device for a vehicle wheel 1 and the like.

Figure 7:
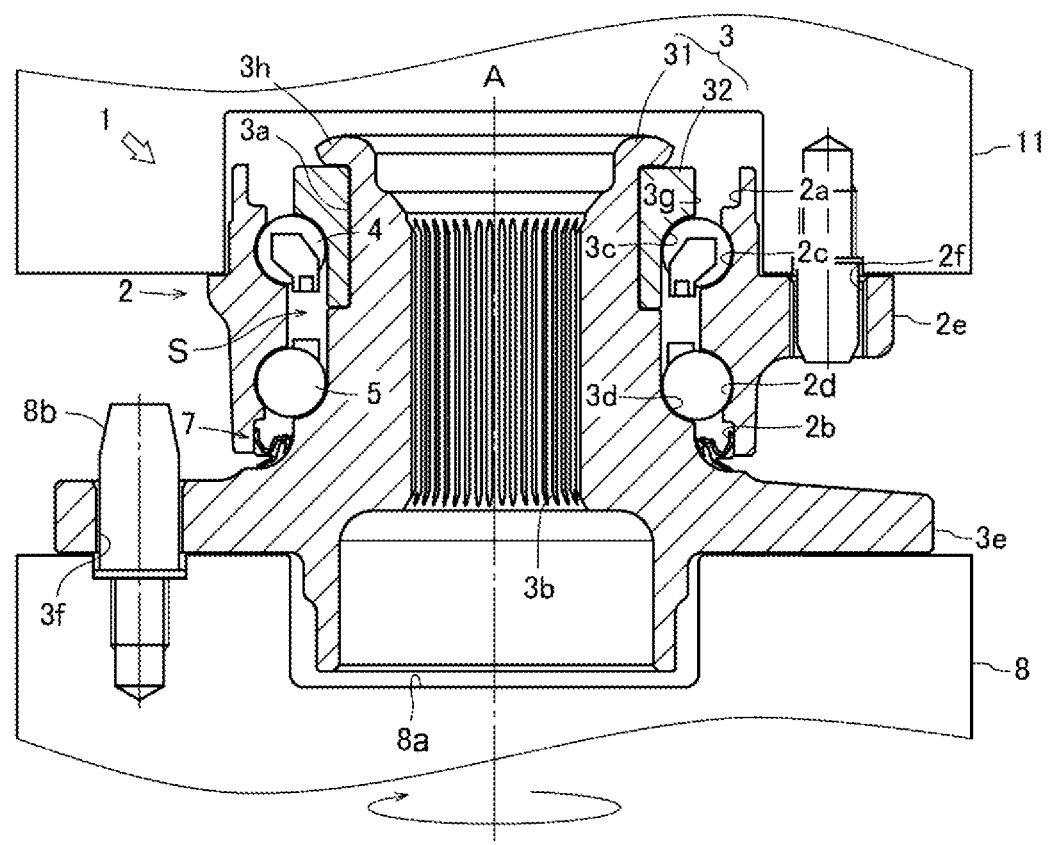
FIG. 7 is a view illustrating a situation in which an outer member or an inner member is relatively rotated to calculate a power.
Figure 8:
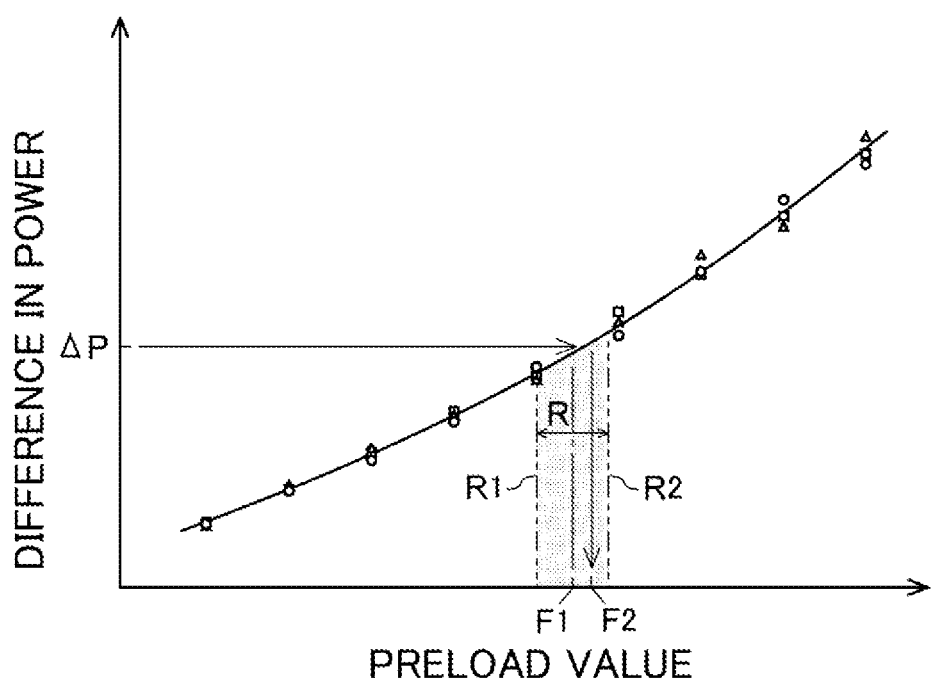
FIG. 8 is a diagram showing a relationship between a difference in power and a preload value.
Figure 9:
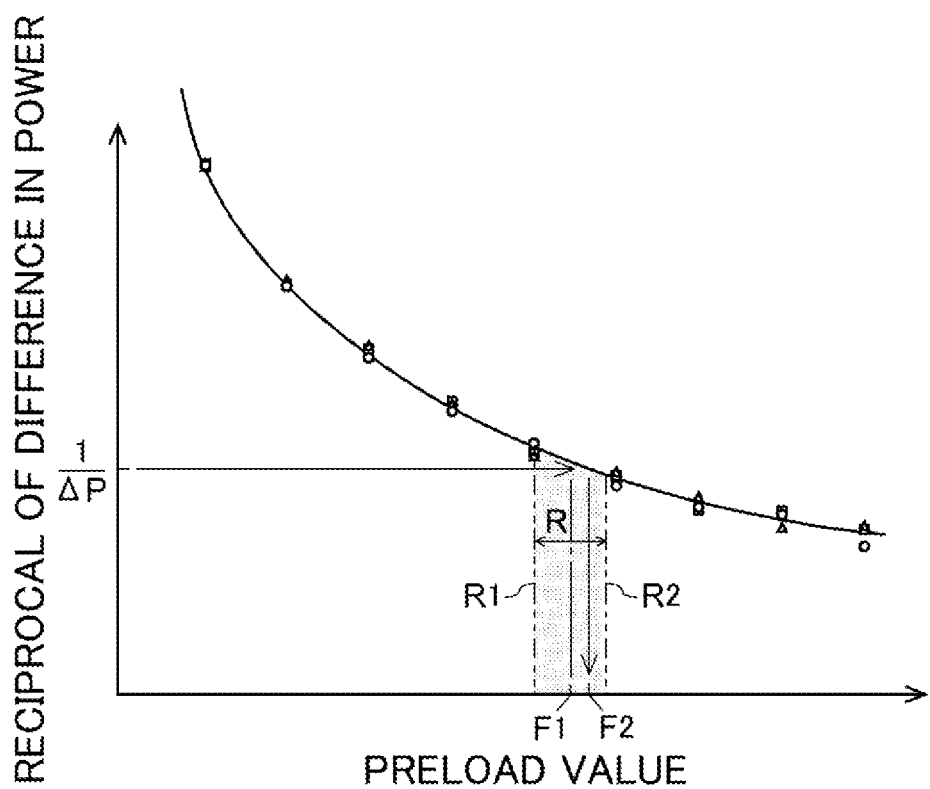
FIG. 9 is a diagram showing a relationship between a reciprocal of a difference in power and a preload value.

A power calculating step S5 is a step of relatively rotating the outer member 2 or the inner member 3 to calculate a power (see FIG. 7). In the power calculating step S5, grease sealed in the annular space S is adapted by rotating the inner member 3 with the outer member 2 stopped using a supporting device 11. Then, a labor L is calculated in a state where the rotation speed is set to a predetermined rotation speed (see Formula 1 below). Lastly, a power P is calculated on the basis of the labor L (see Formula 2 below). In the present embodiment, powers P1 and P2 are calculated at two arbitrarily determined rotation speeds of 1 rpm and 10 rpm. This is because an amount of change (a difference ΔP between the powers P1 and P2) is used to reduce the influence of individual differences due to an amount of grease or the like.

$$\text{labor } L = F \times S = F \times 2\pi RN = 2\pi RFN = 2\pi TN \qquad \text{Formula 1:}$$

$$\text{power } P = 2\pi TN/60 \qquad \text{Formula 2:}$$

(F: tangential load S: movement distance R: rotation radius N: rotation speed T: rotation torque)

A second preload value calculating step S6 is a step of calculating a preload value F2 on the basis of the difference ΔP between the powers P1 and P2. In the preload value calculating step S6, a "relationship between a difference in power and a preload value" determined on the basis of actual results and experience is used (see FIG. 8). The "relationship between a difference in power and a preload value" is represented by a graph in which the vertical axis corresponds to a difference in power and the horizontal axis corresponds to a preload value. Then, the corresponding preload value F2 is calculated by applying the difference ΔP between the powers P1 and P2 obtained in the power calculating step S5 to the graph. The "relationship between a difference in power and a preload value" varies depending on the specifications of the bearing device for a vehicle wheel 1 and the like. Alternatively, powers P1, P2 . . . at three or more rotation speeds may be calculated to calculate preload values F2 ... on the basis of the difference ΔP ... for each combination. In this case, by taking an average value of the preload values F2 ..., the preload value F2 can be calculated with higher accuracy.

In this regard, the second preload value calculating step S6 can be performed also in the following manner. Specifically, in the preload value calculating step S6, a "relationship between a reciprocal of a difference in power and a preload value" determined on the basis of actual results and experience is used (see FIG. 9). Then, the corresponding preload value F2 is calculated by applying a reciprocal of the difference ΔP between the powers P1 and P2 obtained in the power calculating step S5 to the graph. This manner results in that a slope of a curve increases when a rotation speed difference at the time of calculating the powers P1 and P2 is small (when the difference ΔP is small), so that the preload value F2 can be calculated with higher accuracy. The "relationship between a reciprocal of a difference in power and a preload value" also differs depending on the specifications of the bearing device for a vehicle wheel 1 and the like. Alternatively, the powers P1, P2 ... at three or more rotation speeds may be calculated to calculate the preload values F2 ... on the basis of a reciprocal of the difference ΔP ... for each combination. In this case, by taking an average value of the preload values F2 ..., the preload value F2 can be calculated with higher accuracy.

An acceptance determining step S7 is a step of performing acceptance determination using the preload value F1 and the preload value F2. In the acceptance determining step S7, an allowable range R including the preload value F1 is determined from an allowable difference determined on the basis of actual results and experience (see FIG. 8 and FIG. 9). In the present embodiment, a range between an allowable lower limit R1 and an allowable upper limit R2 centered on the preload value F1 is set as the allowable range R. In a case where the preload value F2 falls within the allowable range R, it is determined that a preload state of the bearing device for a vehicle wheel 1 is acceptable. By contrast, in a case where the preload value F2 does not fall within the allowable range R, it is determined that the preload state of the bearing device for a vehicle wheel 1 is unacceptable.

Figure 10:
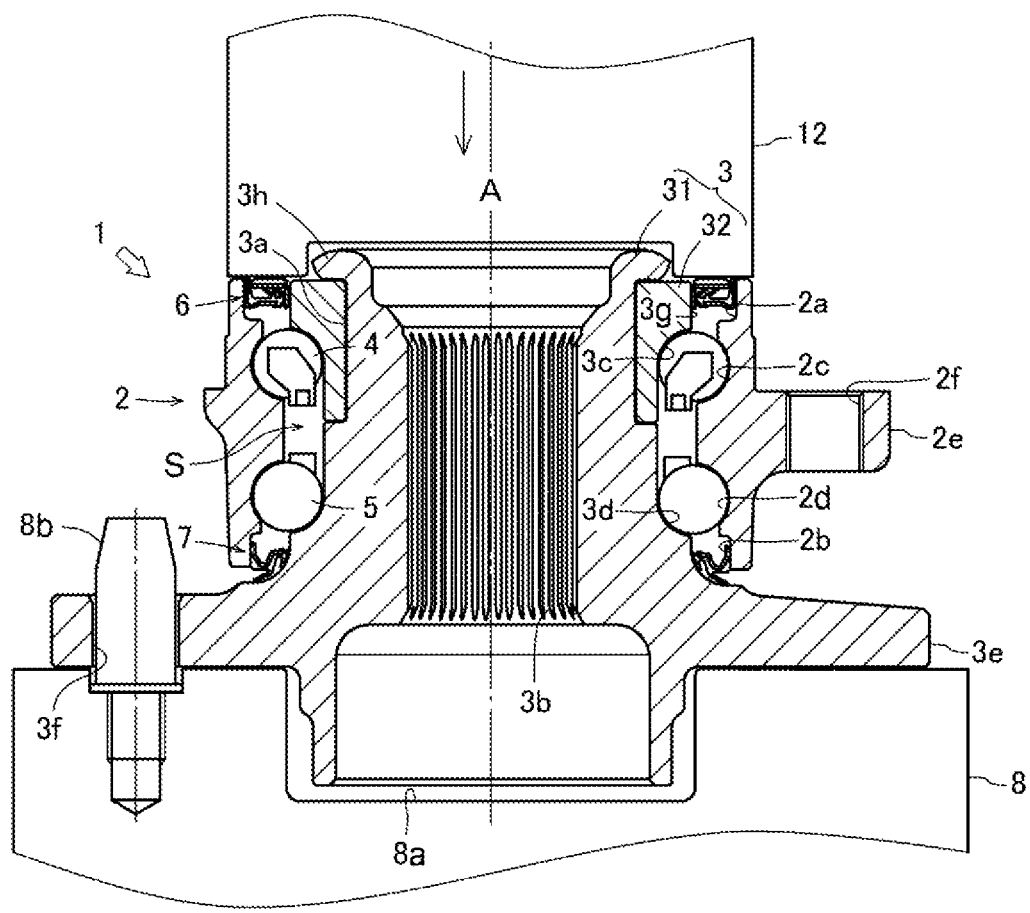
FIG. 10 is a view illustrating a situation in which an inner side seal member is press-fitted into an opening end of an annular space.

An inner side seal member press-fitting step S8 is a step of press-fitting the inner side seal member 6 into the opening end of the annular space S (see FIG. 10). In the inner side seal member press-fitting step S8, the inner side seal member 6 is press-fitted into an entrance portion of the inner side opening end by applying a load using a press-fitting device 12. In this way, the inner side seal member press-fitting step S8 is provided after the power calculating step S5 and the like considering that resistance caused by the inner side seal member 6 is not applied at the time of calculating the power P1, P2. If the inner side seal member press-fitting step S8 is provided before the power calculating step S5 and the like, the power P1, P2 must be calculated with the resistance caused by the inner side seal member 6 subtracted.

In this regard, as in the present embodiment, in a case where the inner side seal member press-fitting step S8 is provided after the power calculating step S5 and the like, the power P1, P2 of the bearing device for a vehicle wheel 1 (the bearing device for a vehicle wheel 1 into which the inner side seal member 6 is press-fitted) in a completed state can be calculated by applying the resistance caused by the inner side seal member 6. This can be similarly calculated by adding the "relationship between a difference in power and a preload value" or the "relationship between a reciprocal of a difference in power and a preload value" of only the inner side seal member 6 to the above described "relationship between a difference in power and a preload value" or the above described "relationship between a reciprocal of a difference in power and a preload value" and correcting the addition result. The "relationship between a difference in power and a preload value" or the "relationship between a reciprocal of a difference in power and a preload value" of only the inner side seal member 6 differs depending on the specification of the inner side seal member 6 or the like.

The technical idea disclosed in the present application and the effects thereof are summarized below.

The preload inspection method for the bearing device for a vehicle wheel 1 according to the present embodiment includes the power calculating step S5 of relatively rotating the outer member 2 or the inner member 3 to calculate the power P1, P2, the preload value calculating step S6 of calculating the preload value F2 on the basis of the power P1, P2 calculated in the power calculating step S5, and the acceptance determining step S7 of determining acceptance on the basis of whether or not the preload value F2 calculated in the preload value calculating step S6 falls within the allowable range R. According to the preload inspection method for the bearing device for a vehicle wheel 1, since the preload value F2 can be calculated without bridging the steps in an assembly process, the preload value F2 is less likely to be affected by a progress of the assembly process, a change in environment, and the like, resulting in enabling the preload value F2 to be calculated with higher accuracy. Consequently, acceptance determination of a preload state can be performed with higher accuracy.

Furthermore, in the preload inspection method for the bearing device for a vehicle wheel 1 according to the present embodiment, the power calculating step S5 includes calculating the powers P1, P2 at a plurality of rotation speeds. In addition, the preload value calculating step S6 includes calculating the preload value F2 on the basis of the difference ΔP between the two powers P1 and P2. According to the preload inspection method for the bearing device for a vehicle wheel 1, influence of individual differences due to the amount of grease and the like becomes less, so that the preload value F2 can be calculated with higher accuracy. Consequently, acceptance determination of a preload state can be performed with higher accuracy.

Furthermore, in the preload inspection method for the bearing device for a vehicle wheel 1 according to the present embodiment, the preload value calculating step S6 includes applying the difference ΔP between the powers P1 and P2 to a predetermined "relationship between a difference in power and a preload value" to calculate the corresponding preload value F2. According to the preload inspection method for the bearing device for a vehicle wheel 1, since the "relationship between a difference in power and a preload value" determined on the basis of actual results and experience is used, the preload value F2 can be calculated with higher accuracy. Consequently, acceptance determination of a preload state can be performed with higher accuracy.

Furthermore, in the preload inspection method for the bearing device for a vehicle wheel 1 according to the present embodiment, the preload value calculating step S6 includes applying the reciprocal of the difference ΔP between the powers P1 and P2 to a predetermined "relationship between a reciprocal of a difference in power and a preload value" to calculate the corresponding preload value F2. According to the preload inspection method for the bearing device for a vehicle wheel 1, since the "relationship between a reciprocal of a difference in power and a preload value" determined on the basis of actual results and experience is used, it is possible to calculate the preload value F2 with higher accuracy. Even in a case where the rotation speed difference at the time of calculating the power P1, P2 is small, the preload value F2 can be calculated with higher accuracy. Consequently, acceptance determination of a preload state can be performed with higher accuracy.

Further, in the preload inspection method for the bearing device for a vehicle wheel 1 according to the present embodiment, the acceptance determining step S7 includes determining acceptance on the basis of whether or not the preload value F2 calculated in the preload value calculating step S6 falls within the allowable range R including the preload value F1 calculated in the separate preload value calculating step S4. According to the preload inspection method for the bearing device for a vehicle wheel 1, acceptance determination is performed on the basis of whether the preload value F2 calculated by a new method using the power P1, P2 falls within the allowable range R including the preload value F1 calculated by a conventional reliable method using the internal gap C. Therefore, determination whether a preload state is acceptable or not can be made with higher accuracy.

As described in the foregoing, the most distinguishing feature of the technical idea disclosed in the present application is that the preload value F2 is calculated using the power P. It should be noted that the difference ΔP between the powers P1 and P2 is used on the basis of such a technical idea. In addition, using the "relationship between a difference in power and a preload value" or the "relationship between a reciprocal of a difference in power and a preload value" determined on the basis of actual results and experience improves the reliability of the results. Furthermore, performing acceptance determination on the basis of whether the preload value F2 falls within the allowable range R including the preload value F1 calculated by the method using the internal gap C also improves the reliability of the result.

According to the preload inspection method for the bearing device for a vehicle wheel 1 according to the present embodiment, it is possible to calculate the preload value F2 using, for example, a rotation torque measurement equipment for use in shipment inspection of the bearing device for a vehicle wheel 1. Since the two powers P1 and P2 are calculated at a time and the preload value F2 is calculated on the basis of the difference ΔP between the powers regardless of an assembly process of the bearing device for a vehicle wheel 1 or a state of the bearing device after the assembly is completed, more accurate calculation of the preload value F2 is possible. Therefore, error factors that are difficult to manage (temperature, grease stirring resistance, sliding resistance of the inner side seal member 6, and the like) can be suppressed.

Lastly, although the bearing device for a vehicle wheel 1 disclosed in the present application is a bearing device for a vehicle wheel that is used for a drive wheel, the device may be a bearing device for a vehicle wheel that is used for a driven wheel. In addition, although the bearing device for a vehicle wheel 1 disclosed in the present application has a third generation structure in which the outer member 2 has the vehicle body mounting flange 2e, and the inner member 3 is configured with the hub ring 31 having the wheel mounting flange 3e and the inner ring 32, the structure is not limited thereto. For example, a second generation structure may be employed in which an outer member has a vehicle body mounting flange, and a hub ring having a wheel mounting flange can be inserted into an inner ring which is an inner member. Further, a fourth generation structure may be employed in which an outer member has a vehicle body mounting flange, and an inner member is a fitting body including a hub ring having a wheel mounting flange and a universal joint. The present invention can be also applied to a bearing device for a vehicle wheel with a so-called outer ring rotation specification in the second generation structure to the fourth generation structure.

INDUSTRIAL APPLICABILITY

The present invention can be used for a preload inspection method for a bearing device for a vehicle wheel.

REFERENCE SIGNS LIST 1 bearing device for a vehicle wheel
2 outer member
2c outer raceway surface
2d outer raceway surface
3 inner member
3a small-diameter step portion
3b spline aperture
3c inner raceway surface
3d inner raceway surface
31 hub ring
32 inner ring
4 rolling body
5 rolling body
6 inner side seal member
7 outer side seal member
F1 preload value
F2 preload value
P1 power
P2 power
ΔP difference in power
S1 inner ring press-fitting step
S2 inner ring caulking step
S3 internal gap measuring step
S4 preload value calculating step
S5 power calculating step
S6 preload value calculating step
S7 acceptance determining step
S8 inner side seal member press-fitting step

The invention claimed is:

1. A preload inspection method for a bearing device for a vehicle wheel, wherein the bearing device for a vehicle wheel includes:
an outer member having multiple-row outer raceway surfaces;
an inner member that is configured with a hub ring and an inner ring press-fitted into a small-diameter step portion of the hub ring and has multiple-row inner raceway surfaces; and
multiple-row rolling bodies each interposed between the raceway surfaces of the outer member and the inner member, the preload inspection method comprising:
rotating one of the outer member and the inner member relative to the other of the outer member and the inner member, and calculating a power based on the rotation of the one of the outer member and the inner member, wherein the calculated power is an amount of labor per unit time;
calculating a preload value, which is applied to the rolling bodies, based on the calculated power; and
determining whether a preload state is acceptable based on whether or not the calculated preload value falls within an allowable range.

2. The preload inspection method for the bearing device for a vehicle wheel according to claim 1, wherein the calculated preload value is a first calculated preload value,
wherein the preload inspection method further comprises calculating a second preload value based on an internal gap of the bearing device for a vehicle wheel,
wherein the determining of whether the preload state is acceptable is performed based on whether or not the first calculated preload value falls within an allowable range including the second calculated preload value.

3. The preload inspection method for the bearing device for a vehicle wheel according to claim 1, wherein
the calculating of the power includes calculating powers at a plurality of rotation speeds, and
the calculating of the preload value includes calculating the preload value based on a difference between two of the calculated powers.

4. The preload inspection method for the bearing device for a vehicle wheel according to claim 3, wherein the calculating of the preload value includes applying the difference between two of the calculated powers to a predetermined relationship between power difference and preload value to calculate a corresponding preload value.

5. The preload inspection method for the bearing device for a vehicle wheel according to claim 3, wherein the calculating of the preload value includes applying a reciprocal of the difference between two of the calculated powers to a predetermined relationship between a reciprocal of power difference and preload value to calculate a corresponding preload value.

* * * * *